United States Patent [19]

Yamada

[11] Patent Number: 5,374,803
[45] Date of Patent: Dec. 20, 1994

[54] LASER CUTTING PROCESS

[75] Inventor: Masahiro Yamada, Ishikawa, Japan

[73] Assignee: Kabushiki Kaisha Komatsu Seisakusho, Japan

[21] Appl. No.: 856,166

[22] PCT Filed: Oct. 12, 1989

[86] PCT No.: PCT/JP89/01050

§ 371 Date: Apr. 2, 1992

§ 102(e) Date: Apr. 2, 1992

[87] PCT Pub. No.: WO91/05631

PCT Pub. Date: May 2, 1991

[51] Int. Cl.⁵ .................................. B23K 26/00
[52] U.S. Cl. ........................ 219/121.72; 219/121.67
[58] Field of Search ............... 219/121.67, 121.72, 219/121.74

[56] References Cited

U.S. PATENT DOCUMENTS

| | | | |
|---|---|---|---|
| 3,629,546 | 12/1971 | Fray | 219/121.67 |
| 3,965,328 | 6/1976 | Locke | 219/121.6 X |
| 4,987,286 | 1/1991 | Allen | 219/121.84 |

FOREIGN PATENT DOCUMENTS 61-108489  5/1986  Japan .
61-154783  7/1986  Japan .
63-268585  11/1988  Japan .

OTHER PUBLICATIONS

International Search Report, Dec. 18, 1989, PCT/JP89/01050.
International Preliminary Examination Report.

*Primary Examiner*—C. L. Albritton
*Attorney, Agent, or Firm*—Ronald P. Kananen

[57] ABSTRACT

The present invention relates to a laser cutting process which can easily obtain a fine cut surface without attaching any dross thereto. The laser cutting process comprises the steps of: applying a piercing to a workpiece by irradiating a laser beam toward a focus thereof adjusted onto an upper surface of the workpiece under as a condition as using air having a relatively low pressure; ejecting air having a high pressure toward a cutting portion of the workpiece from a nozzle main body for emitting the laser beam mounted on a laser processing machine under the condition such that the laser beam is irradiated from the nozzle main body toward a focus thereof adjusted onto a rear surface of the workpiece or the proximity thereof; and cutting the workpiece while blowing off dross generated upon the cutting operation by means of the ejected high pressure air.

3 Claims, 4 Drawing Sheets

LASER CUTTING PROCESS

TECHNICAL FIELD OF THE INVENTION

This invention relates to a laser cutting process in which workpieces such as steel plates are cut off by means of laser beam.

BACKGROUND TECHNIQUE OF THE INVENTION

Heretofore, when cutting off a workpiece, such as a steel plate, by making use of a laser processing machine, $O_2$ gas having a pressure of 0.5 to 6 kg/cm$^2$ has been used as an assist gas under such a condition as focusing a laser beam onto an upper surface of the workpiece. On the other hand, when cutting off a workpiece, such as a thin plate having the thickness of less than 1 mm, air has been used also as an assist gas, because a little dross is attached to the workpiece.

$O_2$ gas can be used as an assist gas without causing any problem when a workpiece is made of soft steel. However, when cutting a workpiece made of material having a high viscosity in its melted state such as, for example, stainless steel, aluminum, and so forth, if the gas is used, it does not become possible to obtain a fine cut surface, because dross generated upon cutting the workpiece is attached to the cut surface.

In order to improve the above mentioned inexpediency, a pressure of assist gas may be raised so as to blow off the dross. However, if the pressure of assist gas is raised, there has been a disadvantage in that a volume of assist gas increases with the result that a costs increase.

On the other hand, when using air as an assist gas, dross tends to attach to a cut surface of a workpiece, because a degree of oxidization of the dross is low as compared with the case in which $O_2$ gas is used as an assist gas. As a result, it does not become possible to obtain a fine cut surface of the workpiece to be cut. Therefore, there has been such an inexpediency as being necessary to require many working steps as an after-treatment such as, for example, an application of machining on the cut surface of the workpiece.

SUMMARY OF THE INVENTION

The present invention has been made in view of the above-described circumstances, and has for its aim to provide a laser cutting process in which a fine cut surface without attaching any dross thereto can be easily obtained.

In order to attain the above-mentioned aim, according to a first feature of the present invention, there is provided a laser cutting process which comprises the steps of: applying a piercing to a workpiece by irradiating a laser beam toward a focus adjusted onto an upper surface of the workpiece under such a condition as using air having a relatively low pressure; ejecting air having a high pressure toward a cutting portion of the workpiece from a nozzle main body for emitting the laser beam mounted on a laser processing machine under the condition such that the laser beam is irradiated from the nozzle main body toward a focus adjusted onto a rear surface of the workpiece or in the proximity thereof; and cutting the workpiece while blowing off dross generated upon the cutting operation by means of the ejected high pressure air.

In the above feature, a high pressure type air compressor which can supply air having a pressure of 8 to 15 Kg/cm$^2$ is used as a supply source of high pressure air. In addition, according to a second feature of the present invention, there is provided a laser cutting process as set forth in the above-described first feature, the laser cutting process being characterized in that, after applying the piercing, a feed speed of the nozzle main body along the cutting direction of the workpiece is varied gradually such as, for example, at three stages, in turn, of 10%, 20% and 40% of a preset value of speed.

According to the present invention having the foregoing features, since the laser cutting process is adapted such that the focus of the laser beam is adjusted onto the rear surface of the workpiece or in the proximity thereof and that the workpiece is cut by means of laser beam while ejecting air having a high pressure of 8 to 15 kg/cm$^2$ from the nozzle main body for emitting the laser beam, it becomes possible to cut the workpiece efficiently. In addition, since dross generated upon the cutting operation is blown off by the jet of high pressure air, a fine cut surface without sticking any dross thereto is obtained even when such a workpiece as being made of stainless steel or aluminum, etc., which has a high viscosity in its melted state.

Further, since the high pressure air is used as an assist gas, it becomes possible to reduce remarkably the running cost as compared with the case in which $O_2$ gas is used as an assist gas.

The above and many other advantages, features and additional objects of the present invention will become manifest to those versed in the art upon making reference to the following detailed description and accompanying drawings in which preferred structural embodiments incorporating the principles of the present invention are shown by way of illustrative example.

DETAILED DESCRIPTION OF THE INVENTION

Hereinafter, an example of the present invention is described in detail with reference to the accompanying drawings.

Figure 2:
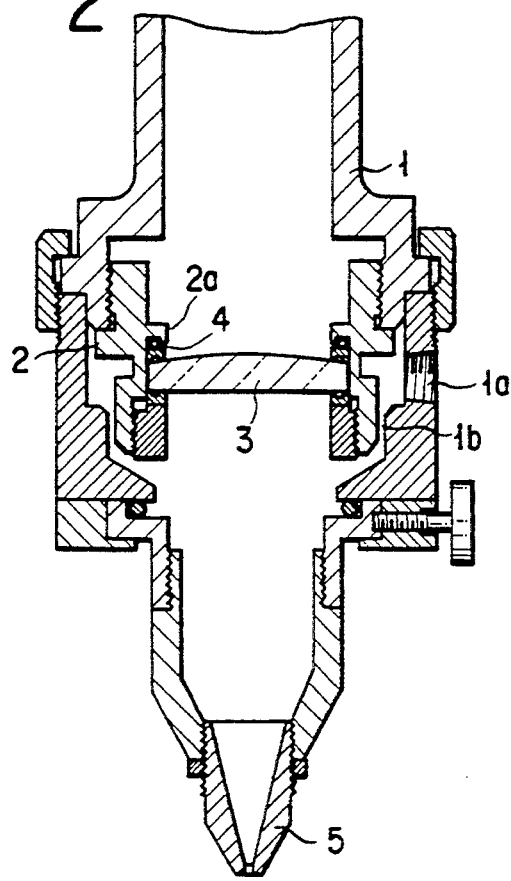
FIG. 2 is an enlarged sectional view showing a nozzle main body.

In the drawings, reference numeral 1 shows a nozzle main body mounted on a laser processing machine and having therewithin a lens supported by a lens holder 2 as shown in FIG. 2.

Since as an assist gas as having a high pressure is used, the lens 3 is made of a pressure-proof lens and retained airtightly at a high level of pressure by means of an O-ring 4 interposed between itself and an annular support portion 2a formed convexly in an inner peripheral surface of the lens holder 2. On a side portion of the lens holder 2, there is provided an assist gas supply port 1a from which air having a high pressure of 8 to 15 kg/cm$^2$ is supplied into the nozzle main body 1.

The air supplied into the nozzle main body 1 is allowed to flow out from the assist gas supply port 1 a formed between the lens 3 and the lens holder 2 toward the leading end of the nozzle main body 1, and then ejected from a nozzle 5 mounted on the leading end of the nozzle main body 1 toward a workpiece 7 together with a laser beam 6 condensed by the lens 3.

Figure 1:
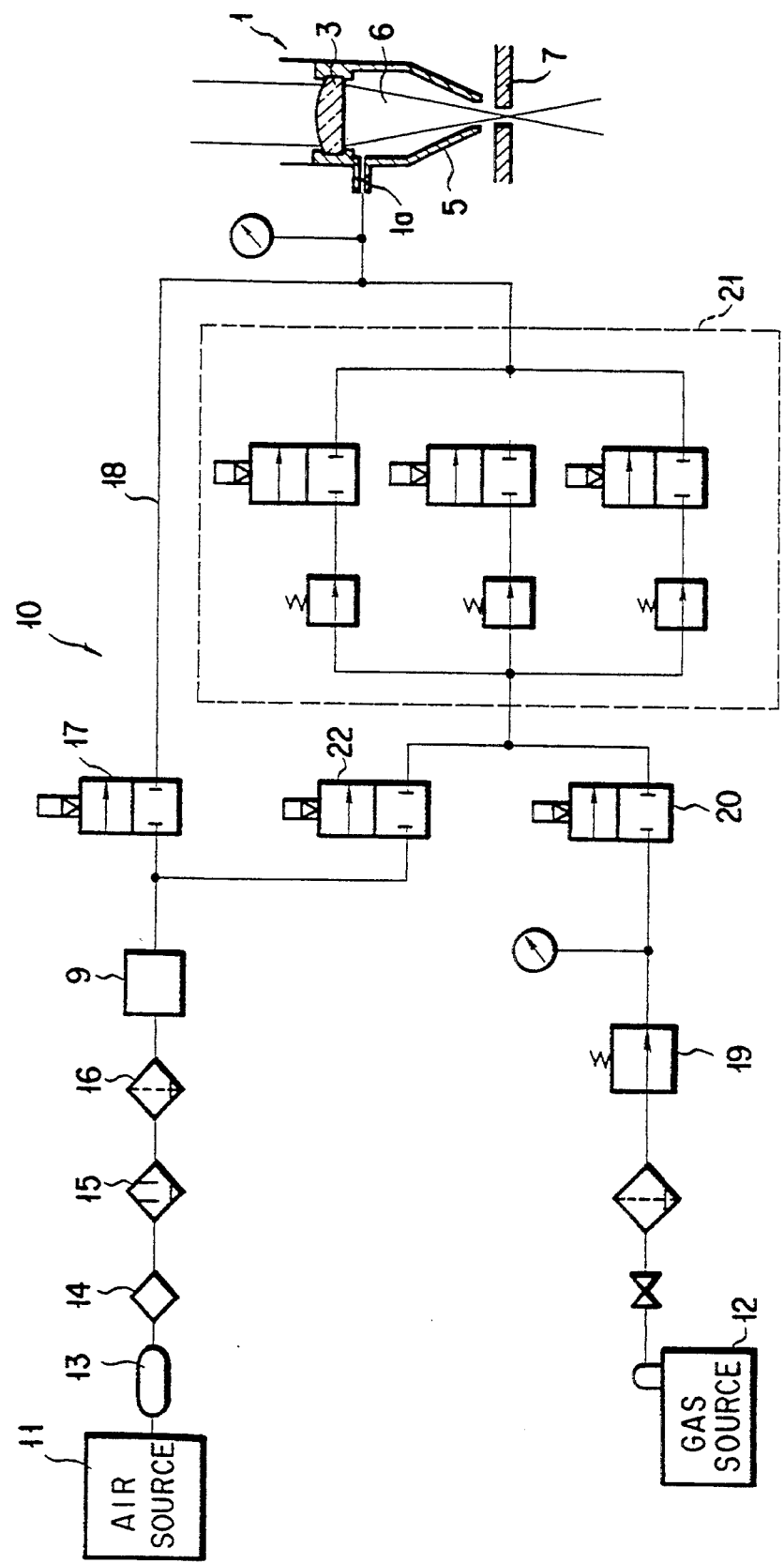
FIG. 1 is a circuit diagram showing a whole system for practising a method of the present invention.

In addition, the assist gas supply port 1a of the nozzle main body 1 is connected to a circuit system 10 for supplying the assist gas, shown in FIG. 1.

The assist gas supply circuit system 10 is provided therein with an air source 11 constituted of a high pressure type compressor and an $O_2$ gas source 12 in which $O_2$ gas is contained. The high pressure air issued from the air source 11 is accumulated within a tank 13 so as to maintain a constant pressure therein, and thereafter introduced into a solenoid operated valve 17 via, inturn, a filter 14, a mist separator 15, an oil separator 16 and an air drier 9. Subsequently, the air is further supplied through a conduit 18 into the assist gas supply port 1 a when the solenoid operated valve 17 is opened.

Further, $O_2$ gas issued from the $O_2$ gas source 12 is introduced into a regulator 19 so as to stabilize its pressure, and thereafter supplied to a gas pressure change-over device 21 when a solenoid operated valve 20 is opened. In the gas pressure change-over device, the gas pressure is changed over, for example, at three stages. Thus, the $O_2$ gas is supplied into the assist gas supply port 1a also after its pressure is changed over to a predetermined gas pressure by the action of the gas pressure change-over device 21.

In the next place, a laser cutting process of the present invention is hereinafter described. Firstly, a piercing is carried out before a workpiece 7 is cut off. The piercing is performed by use of an air having a low pressure (0.5 to 1.5 $kg/cm^2$) as an assist gas which is supplied through the assist gas supply port 1a after introducing an air of a high pressure issued from the air source 11 into the gas pressure change-over device 21 through the solenoid operated valve 22 and changing its pressure to a low pressure as described above by the action of the gas pressure change-over device.

In addition, at that time, in order to carry out the piercing efficiently, the focus of the laser beam 6 is adjusted or brought onto the upper surface of the workpiece 7.

As described above, after the piercing applied to the workpiece 7 by means of the laser beam 6 is finished, the feed speed of the nozzle main body 1 in the cutting direction of the workpiece is accelerated until the feed speed becomes a predetermined value in accordance with a command previously programed by a control signal issued from an NC control device (not shown). At that time, the condition of cutting-off the workpiece tends to be unstable. In particular, in when using air as an assist gas, it tends to cause the unstable cutting condition because of less oxidization as compared with the case of using $O_2$ gas as an assist gas.

Figure 3:
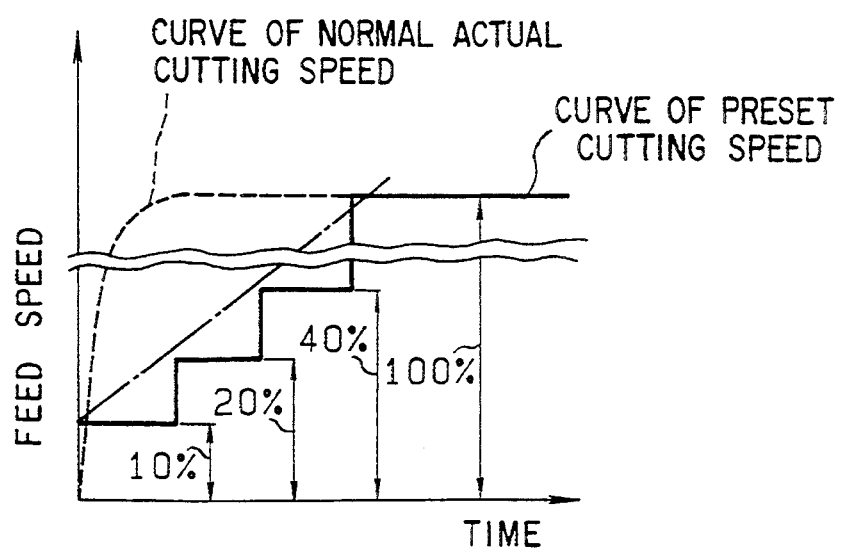
FIG. 3 is a graph showing a feed speed of a nozzle main body upon the cutting operation.

For this reason, in a laser cutting process of the present invention, the feed speed of the nozzle main body 1 is varied gradually at, for example, three stages of 10%, 20% and 40% of a preset feed speed as shown in FIG. 3 and, at the same time, air having a high pressure (8 to 15 $kg/cm^2$) is supplied from the air source 11 to the assist gas supply port 1a of the nozzle main body 1 when the solenoid operated valve 17 is opened.

By this, the unstable cutting condition upon the commencement of the cutting-off of the workpiece is eliminated and, at the same time, a fine cut surface without attaching any dross thereto is obtained because the dross generated upon the cutting-off of the workpiece is blown off by means of the high pressure air.

Figure 4:
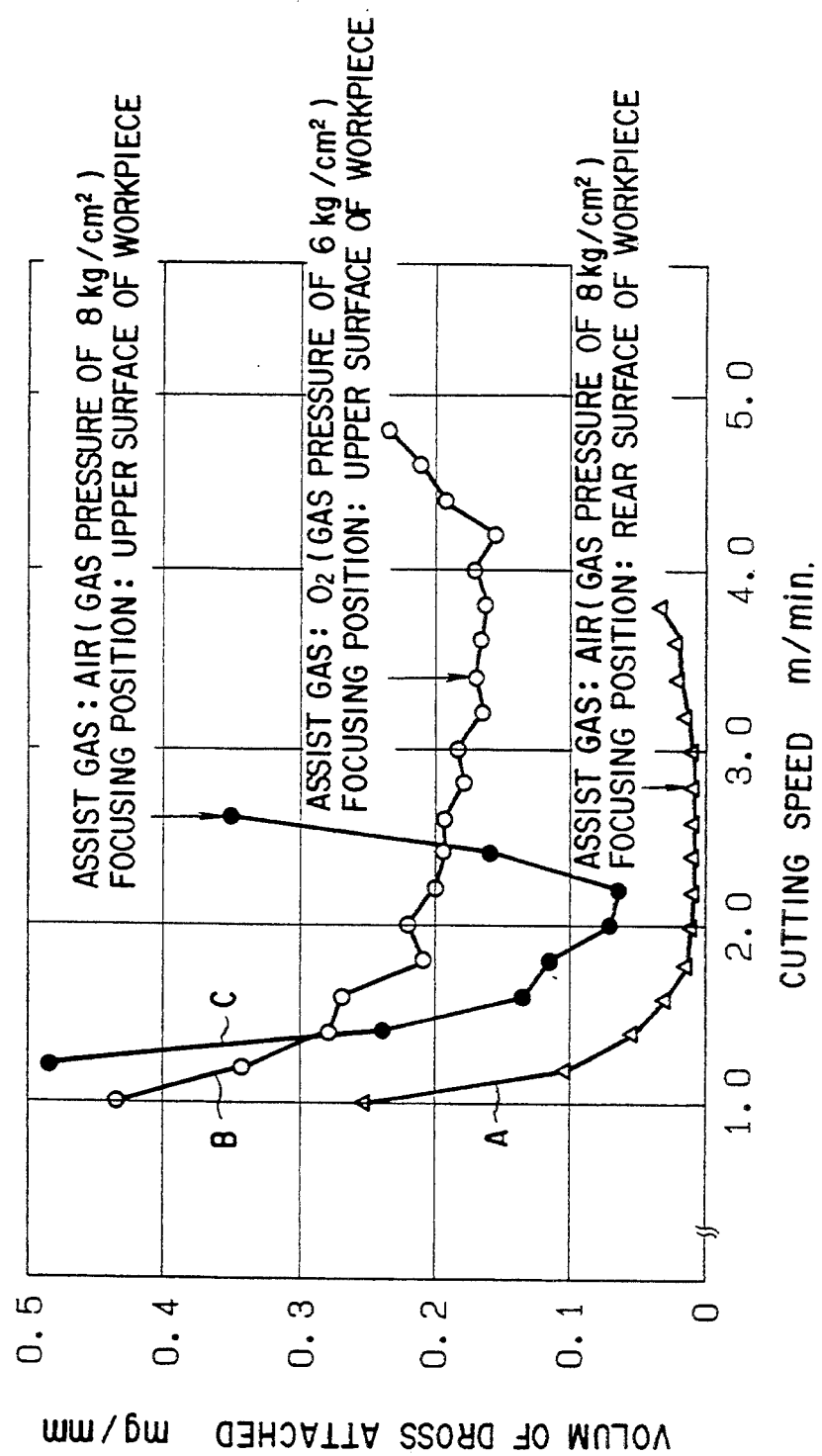
FIG. 4 is a graph showing a relation between a cutting speed by means of the nozzle main body and a volume of dross attached to a workpiece.

For one's information, a comparison between an attached weight of dross in the laser cutting process of the present invention in which the focus of the laser beam 6 is adjusted onto the rear surface of the workpiece to be cut off and that in a laser cutting process of the prior art in which $O_2$ gas having a pressure of 6 kg/cm is used as an assist gas and in which the focus of the laser beam is adjusted onto the upper surface of the workpiece to be cut off is as shown in the graph of FIG. 4.

In the graph, a curve A denotes results in the laser cutting process of the present invention, while a curve B represents results in the laser cutting process of the prior art, and further a curve C denotes comparative results in a laser cutting process in which air having a high pressure is used as an assist gas, but the focus of the laser beam 6 is adjusted onto the upper surface of the workpiece 7 to be cut off.

Figure 5:
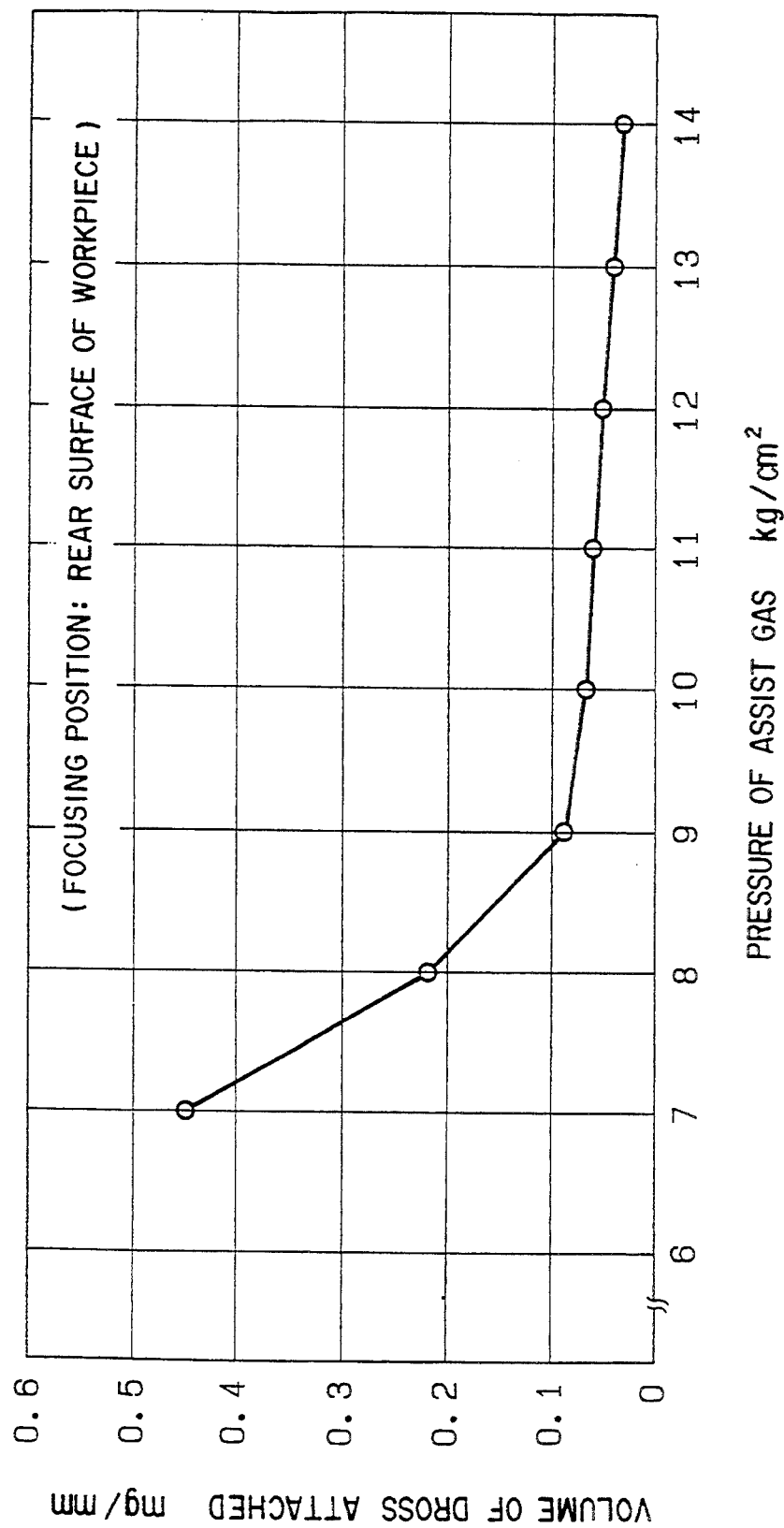
FIG. 5 is a graph showing a relation between a pressure of an assist gas and a volume of dross attached to a workpiece.

Further, FIG. 5 is a graph showing relation between a pressure of an assist gas and volume of dross attached to a workpiece cut off by the laser cutting process of the present invention.

I claim:

1. A laser cutting process which comprises the steps of:
    (a) applying a piercing to a workpiece by irradiating a laser beam toward a focus thereof adjusted onto an upper surface of the workpiece under as a condition as using air having a relatively low pressure;
    (b) ejecting air having a high pressure toward a cutting portion of the workpiece from a nozzle main body for emitting the laser beam mounted on a laser processing machine under the condition such that the laser beam is irradiated from the nozzle main body toward a focus thereof onto a rear surface of the workpiece or the proximity thereof; and
    (c) cutting the workpiece by means of the laser beam while blowing off dross generated upon the cutting operation by means of said ejected high pressure air.

2. A laser cutting process as set forth in claim 1, characterized in that, after applying said piercing to the workpiece, a feed speed of said nozzle main body along the cutting direction of the workpiece is varied gradually at three stages of approximately 10%, 20% and 40%, in turn, of a preset feed speed.

3. A laser cutting process as set forth in either one of claims 1 and 2, characterized in that said high pressure air source supplied upon the cutting operation is a high pressure type compressor which enables itself to supply air having a pressure of 8 to 15 $kg/cm^2$.

* * * * *